United States Patent
Geest et al.

(10) Patent No.: US 8,151,652 B2
(45) Date of Patent: Apr. 10, 2012

(54) CORIOLIS FLOW SENSOR WITH RESILIENTLY SUSPENDED BALANCING MASS

(75) Inventors: Jan Wouter van de Geest, Zutphen (NL); Marcel Ronald Katerberg, Deventer (NL); Jan Marinus Zwikker, Hengelo (NL); Hernes Jacobs, Rossum (NL)

(73) Assignee: Berkin B.V., Ruurlo (NL)

( * ) Notice: Subject to any disclaimer, the term of this patent is extended or adjusted under 35 U.S.C. 154(b) by 317 days.

(21) Appl. No.: 12/637,134

(22) Filed: Dec. 14, 2009

(65) Prior Publication Data

US 2010/0154564 A1   Jun. 24, 2010

(30) Foreign Application Priority Data

Dec. 19, 2008 (NL) ..................................... 1036341

(51) Int. Cl.
*G01F 1/84* (2006.01)

(52) U.S. Cl. .................................................. 73/861.355

(58) Field of Classification Search .................. None
See application file for complete search history.

(56) References Cited

U.S. PATENT DOCUMENTS 6,397,685 B1 * 6/2002 Cook et al. ............... 73/861.357
2006/0243067 A1 * 11/2006 Mehendale et al. ..... 73/861.355
2007/0034019 A1 2/2007 Doihara et al.

FOREIGN PATENT DOCUMENTS

EP     1 719 982     11/2006

OTHER PUBLICATIONS

Search Report dated Jun. 4, 2009, from corresponding Netherlands application.

* cited by examiner

*Primary Examiner* — Harshad Patel
(74) *Attorney, Agent, or Firm* — Young & Thompson

(57) ABSTRACT

A Coriolis flow sensor with a Coriolis tube that is fastened in a housing and that can be excited with a certain frequency, wherein a balancing mass (inertia) is arranged with rotational flexibility between the tube fastening and the housing. In particular, a spring steel plate is used for providing a connection rigidity between the balancing mass and the housing, which plate comprises a fixed portion and a movable portion cut out from the fixed portion, wherein the incisions are formed such that the fixed and movable portions are interconnected via resilient plate portions, which resilient plate portions are in particular elongate strips lying in one line and realizing a rotational flexibility (torsion), while abutments are provided which limit the amplitude of movements of the balancing mass.

16 Claims, 12 Drawing Sheets

CORIOLIS FLOW SENSOR WITH RESILIENTLY SUSPENDED BALANCING MASS

The invention relates to a Coriolis flow sensor with a Coriolis tube that has two ends and is fastened in a housing, said ends being fixed in a fixation means while the tube portion located between said two ends lies free, which flow sensor comprises excitation means for causing the tube to oscillate about an excitation axis and detection means for detecting displacements of portions of the tube during operation.

A Coriolis flow sensor (or: Coriolis flow sensor system) comprises at least one vibrating tube, often denoted Coriolis tube, flow tube, or sensing tube. This tube (or these tubes) is (are) fastened at both ends to the housing of the instrument. The tube ends also serve for the supply and discharge of the liquid or gas flow to be measured.

Besides the flow tube (or tubes), a Coriolis flow sensor further comprises two more subsystems, i.e. for excitation and for detection. The excitation system (excitator) brings the tube into vibration. One or several forces or torques are applied to portions of the tube. The detection system usually detects the displacement of one or several points of the tube as a function of time. Instead of the displacement, the force (or torque) applied by the tube to its surroundings may be detected; what is described further below for the displacement detection is equally valid for force detection.

The same two alternative placements are possible for both excitation and detection. One is that the excitation or detection takes place between the housing and the tube. The other is that the excitation or detection takes place between different points or sections of the moving tube or—if the flow sensor (sometimes called "the (sensor) instrument", or "the flow meter" hereinafter) has several flow tubes—between the individual flow tubes.

It is desirable in the case of a Coriolis flow sensor designed for measuring small flows that the entire tube should lie in one plane, both because of measuring accuracy and because of producibility.

The tube vibration generated by the excitator takes place at a more or less fixed frequency which varies slightly only with the density of the medium flowing through the tube. The vibration frequency is practically always one of the natural frequencies of the tube, so that a maximum amplitude can be achieved with a minimum energy input.

The invention is based on the recognition that without additional measures the vibration of the tube may give rise to two vibration problems:

1. A first problem may occur when two identical instruments are placed close together and their vibrations frequencies substantially coincide. The one instrument then may excite the other instrument via the housing and the supporting surface, and in general just next to its natural frequency, with a phase that will practically always differ from that of the respective excitation thereof. This is a real problem because in practice, for example in mixing processes, two, three or sometimes up to twenty flowmeters are located next to one another. The experience then is that the measuring results may vary with a certain periodicity independently of the flow.
2. A second problem is sensitivity to its own vibrations: when a Coriolis flowmeter is mounted on a non-rigid surface, for example a thin plate, or in a tube system, the respective supporting part may start to vibrate along with the flowmeter. The own vibrations are seen as a shift in the zero point. The accuracy of the sensor, and accordingly of the measurement, is influenced in an unpredictable manner thereby.

It is an object of the invention to reduce the sensitivity to vibrations in a Coriolis flow sensor, especially in Coriolis flow sensors of the type in which the detection (and excitation) take place with respect to the housing. The particular object is to reduce the sensitivity to the sensor instrument's own vibrations or to vibrations of adjoining flow sensor instruments.

This object is achieved in a Coriolis flow sensor of the kind described in the opening paragraph in that the fixation means is connected to a balancing mass, and in that the total assembly of balancing mass and fixation means is resiliently suspended relative to the housing by resilient by resilient suspension means such that said assembly can rotate about a rotation axis that is at least substantially parallel to or coincides with the excitation axis of the tube.

The term 'balancing mass' here and in the following denotes a body whose moment of inertia relative to said axis of rotation is substantially greater (in particular a number of times greater) than that of the Coriolis tube.

Measurements have shown inter alia that the resilient mounting of the Coriolis tube as described here reduces the transfer of vibrations from a Coriolis tube to the housing during operation and that a first instrument resiliently mounted in this manner interferes with an adjacent second instrument to a lesser degree. Also, the accuracy of a stand-alone flow sensor with resiliently mounted Coriolis tube is improved.

Tube displacements can be detected between the tube and the housing or between individual parts of the tube. The principle of the invention, however, is particularly suitable for use in combination with a detection of displacements of the tube with respect to the housing.

A practical embodiment is characterized in that the flow sensor is provided with a support plate (more in general: support means), in that at least one of the fixation means with the ends of the Coriolis tube fixed therein and the balancing mass is fastened on this support plate, and in that the support plate is suspended relative to the housing by means of two torsion spring means in linear arrangement such that it can rotate about said rotation axis.

The torsion spring means here provide a rotational flexibility (torsion). In the context of the invention, therefore, the fixation means and the balancing mass may be jointly fastened on the support plate, or one of them may be fastened on the support plate.

It may be advantageous, especially in the case in which either the fixation means or the balancing mass is fastened to the support plate, when the balancing mass and the fixation means are flexibly (in particular with torsion possibility) connected to one another. The torsion spring means, which are to make the desired movement of the support plate possible, may be constructed in various manners.

A suitable embodiment is characterized in that the resilient suspension means comprises torsion spring means which connect the support plate directly or indirectly to the housing and which are formed by torsion hinges, obliquely positioned blade springs, or cross-spring hinges, which may or may not be planar.

The flow sensor according to the invention may comprise a base plate that is fixedly fastened to the housing and a separate support plate that is movable relative to this base plate.

A preferred embodiment, however, is characterized in that the flow sensor is provided with a base plate of resilient metal that is fixedly connected to the housing, which base plate has a central opening, and in that the support plate and the torsion spring means extend within said opening and are formed from the material of the base plate by means of incisions provided in the base plate, such that the torsion spring means have the shape of elongate strips which constitute the sole connection between the support plate and the base plate and the support plate is suspended in the opening of the base plate by means of said elongate strips. An advantage of this is that the base plate, support plate, and torsion spring means can be manufactured with high accuracy from one piece of material. The assembly of base plate and support plate may form a flat plate in the context of the invention.

However, a further preferred embodiment is characterized in that the assembly of base plate and support plate forms a folded plate. This has the advantage of a greater rigidity of the assembly as compared with a planar construction. A further advantage is that the assembly of base plate and support plate can be provided with integrated abutment points for limiting the amplitude of relative movements of the support plate with respect to the base plate in the plane of the base plate. As will be explained in more detail below, this is possible both in the planar construction and in the folded construction. An additional advantage of the folded construction is that the assembly of base plate and support plate can be provided with integrated abutment points for limiting the amplitude of relative movements of the support plate with respect to the base plate both in and transverse to the plane of the base plate.

A further embodiment is characterized in that the elongate strips are each bounded on either side by a respective incision, said incisions forming an elastic hinge with integrated abutment.

A further embodiment is characterized in that the incisions bounding the strips on either side have a width such that the plate material at the other side of the incisions acts as an abutment for limiting the amplitude of movements in the plane of the base plate.

In an embodiment of the assembly of base plate, support plate, and strip-shaped torsion spring means in a planar construction, it is furthermore advantageous if abutment plates are arranged above and below at least one elongate strip, which plates are each kept at a distance from the strip by a spacer plate so as to serve as an abutment for limiting movements of the support plate away from the plane of the base plate.

The use of a resiliently suspended balancing mass is an essential part of the invention.

A further embodiment is characterized in that the balancing mass is arranged transverse to and with its center of gravity on the axis about which it can rotate. Preferably, the greatest mass portion of the balancing mass is located adjacent its ends farthest removed from its axis of rotation. In other words: the balancing mass comprises a bridge part that is made heavier at its ends.

A further embodiment is characterized in that the balancing mass comprises or supports at least one component of a magnetic yoke for the purpose of Lorentz excitation of the Coriolis tube.

A highly advantageous aspect of the inventive resilient suspension of the balancing mass is that the Coriolis tube is not directly excited (made to vibrate), but is indirectly excited. To achieve this, either the balancing mass or the tube fixation means cooperates with actuator means for causing the balancing mass and the tube fixation means to rotate about said axis.

A first embodiment of this principle is characterized in that said actuator means are electromagnetic actuator means.

A second embodiment of this principle is characterized in that said actuator means are Lorentz force actuator means.

A few embodiments of the invention will be described in more detail below with reference to the drawing, in which.

Figure 1:
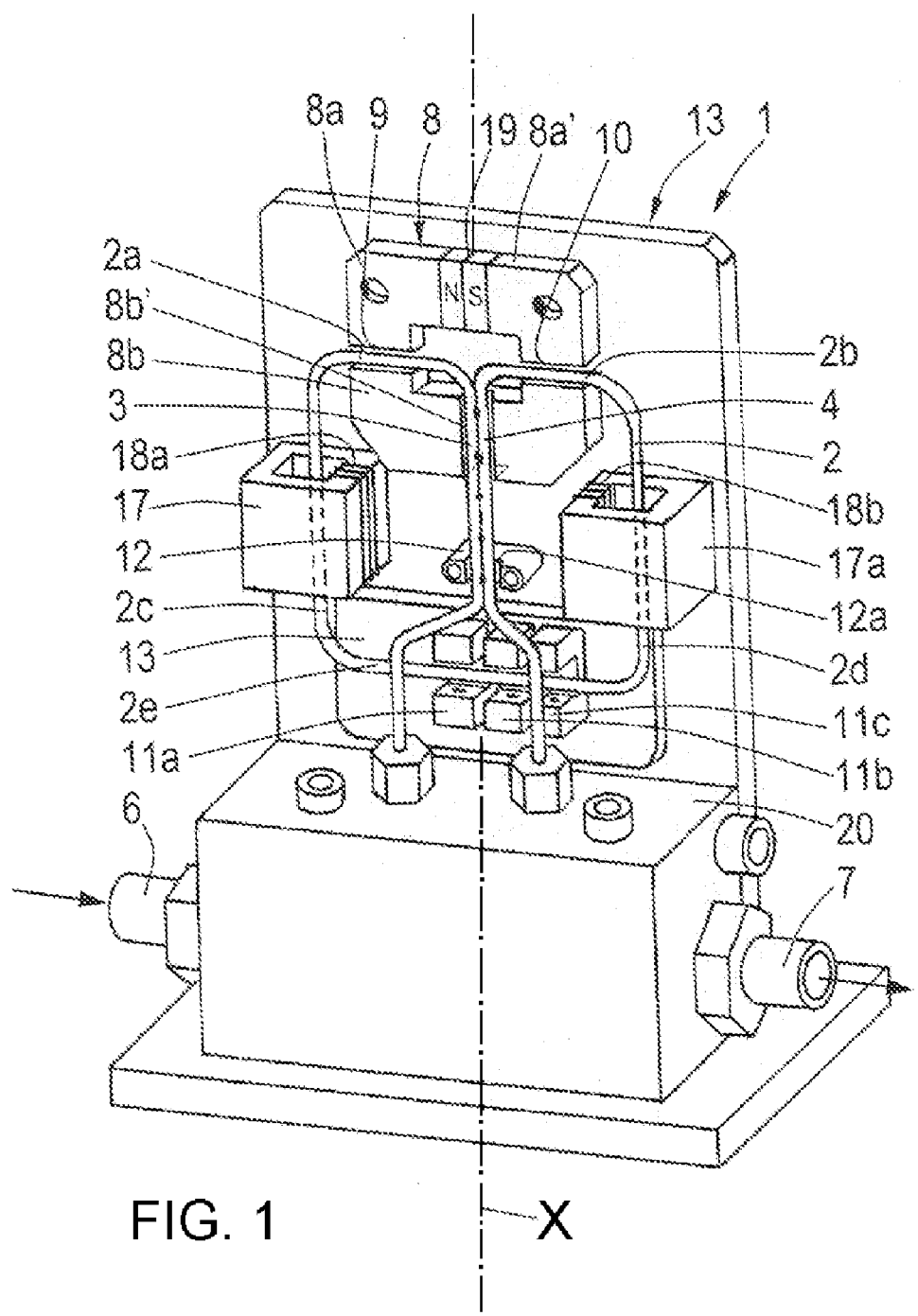
FIG. 1 shows a mass flow sensor with a Coriolis tube.

FIG. 1 shows an embodiment of a flow sensor 1 of the Coriolis type with a loop-shaped Coriolis (or sensing) tube 2 that is bent into a rectangular shape and that follows a substantially circumferential path (forming a substantially complete turn). The loop-shaped flow (or sensing) tube 2 in this embodiment comprises two parallel lateral tube portions 2c, 2d which are connected at one end to a first transverse tube portion 2e and at the other end to two second transverse tube portions 2a, 2b. The latter are connected, at the sides opposed to the ends where they are connected to the lateral tubes 2c, 2d, to a flexible feed tube 3 and a flexible discharge tube 4 for a flowing medium, respectively. The loop 2 and the feed and discharge tubes 3, 4 are preferably part of one and the same piece of tubing. The entirety of the tube 2 is bent into a rectangular shape, the corners being rounded for making this bending possible. The feed tube 3 is connected to a feed line 6 and the discharge tube 4 to a discharge line 7 via a feed and discharge block 20. The feed and discharge tubes 3, 4 in this embodiment extend within the loop 2 and are fastened to a frame 13 with fastening means 12. The flexible feed and discharge tubes 3, 4 do not form part of the loop shape of the sensing tube 2 but provide a flexible fastening of the loop 2 to the frame 13. The loop 2 may accordingly be regarded as being flexibly suspended from the feed and discharge tubes 3,4. The loop 2 and the feed and discharge tubes 3, 4 may advantageously be manufactured from one piece of tubing. This may be, for example, a stainless steel tube with an outer diameter of approximately 0.7 mm and a wall thickness of approximately 0.1 mm. The invention is suitable not only for use with small tube dimensions (outer diameter, for example, smaller than 1 to 1.5 mm) but in particular also for use with tubes of larger diameters.

The tubes 3 and 4, which run close together on either side of and symmetrically with respect to the main axis of symmetry S of the tube 2, are fastened to the fastening means 12, for example by means of clamping, or by means of soldering, gluing or welding, said fastening means 12 in their turn being fastened to the frame 13. Alternatively, the tubes 3, 4 may be directly fastened to the frame 13.

Excitation means for causing the tube 2 to rotate about the main axis of symmetry (in this case the primary or excitation axis) or axis of rotation in the construction of FIG. 1 comprise a magnetic yoke 8 with two air gaps 9 and 10 through which portions 2a and 2b (denoted the second transverse tubes above) of the loop-shaped tube 2 extend, which yoke is fastened to the frame 13 and is provided with a permanent magnet 19, and means for introducing an electric current into the tube 2. In FIG. 1 these are means for generating an electric current in the tube 2 by means of induction. The permanently magnetic magnet yoke 8 has two upper yoke parts 8a and 8a' which are separated from a lower yoke part 8b by the air gaps 9 and 10. The permanent magnet 19 is arranged between the yoke parts 8a and 8a' with its one (North) pole facing the yoke part 8a and its other (South) pole facing the yoke part 8a'.

Current is induced in the tube 2 in this case by two transformer cores 17, 17a which are each provided with a respective electric coil 18a, 18b and through which the respective lateral tube portions 2c and 2d are passed. One transformer core may suffice, as desired. The coils 18a, 18b may be wound on the inner sides of the transformer cores, as shown here, or on one of the other sides. The combination of the mutually opposed magnetic fields which are generated in the gaps 9 and 10 of the permanently magnetic yoke and which are directed transversely to the current direction, and an (alternating) current induced in the tube 2 exerts a torque on the tube whereby it starts to rotate (oscillate) about the axis of rotation (i.e. to vibrate in the so-termed twist mode).

When a medium is flowing through the tube, the tube will start to oscillate about a response axis transverse to the axis of rotation under the influence of Coriolis forces (so-termed swing mode). During operation the (sinusoidal) displacements of points of the tube portion 2e, which are representative of the flow, are detected by a Coriolis effect sensor which comprises a first sensor 11a located adjacent the tube portion 2e and a second sensor 11b. The first and the second sensor are symmetrically arranged on either side of the excitation axis or axis of rotation close to the point of intersection thereof with the tube portion 2e. A third sensor 11c may serve for correction purposes. The sensors may be, for example, of an electromagnetic, inductive, capacitive, or ultrasonic type. However, optical sensors were chosen in the embodiment of FIG. 1. So-termed optoelectronic sensors 11a, 11b, 11c were used as the optical sensors, each having a U-shaped housing that is fastened to the frame 13 with a light source in one leg of the U (for example an LED) and a light-measuring cell (for example a phototransistor) arranged in the other leg opposite the light source. The tube portion 2e, or a vane fastened thereto, is capable of moving between the legs of the U-shaped sensor housings 11a, 11b (and 11c, if present), thus intercepting more or less light from the light source.

It is essential for the present invention that the fixed ends of the Coriolis tube 2 are not directly screwed to the housing of the instrument, but are coupled (via tube fixation means) to a balancing mass that is resiliently suspended in the housing. The natural frequency of the suspension of this balancing mass must be substantially lower than the frequency at which the tube is vibrating. (The natural frequency is proportional to the rigidity divided by the mass). The vibration of the tube as well as that of the balancing mass is a rotational movement. The axis of rotation of the excitation rotation of the tube and the axis of rotation of the resilient suspension coincide at least substantially. It is furthermore favorable, but not essential, if the moment of inertia of the balancing mass about the axis of rotation is substantially greater than the moment of inertia of the tube about its axis of rotation.

In an embodiment, the balancing mass and the tube fixation means are mounted on a support plate that is resiliently positioned relative to the housing.

According to a first aspect of the invention, the support plate is a planar plate that is suspended by means of resilient elements having a torsion spring effect.

Figure 2:
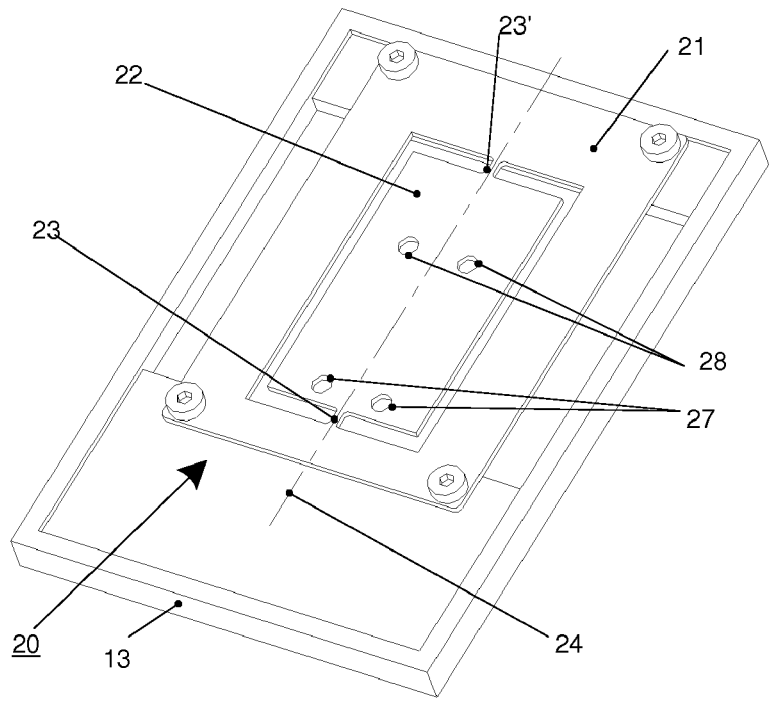
FIG. 2 shows a base plate made in one piece with a resiliently suspended central portion for suspending a Coriolis tube.

FIG. 2 shows a favorable embodiment of a component in which these resilient elements are incorporated. This comprises a planar metal plate 20 of a resilient material such as, for example, spring steel, in which incisions (cross cuts) have been made by means of a process step (such as laser cutting or etching). A movable central portion or support plate 22 has been created thereby in the plate within a fixed, circumferential portion or base plate 21. Said two portions are interconnected exclusively through two long and narrow strip-shaped elements or bridges 23, 23' of rectangular cross-section which lie in line with an axis of rotation 24. These bridges act as torsion spring elements. The desired flexibility is that of a torsional movement about the axis of rotation 24. Those skilled in the art may minimize any other, undesirable flexibilities of the bridges 23, 23', such as a translation away from the plane of the metal plate, by choosing the geometry of the bridges 23, 23' in combination with a balancing mass to be fastened to the movable portion 22 such that the natural frequencies belonging to said undesirable flexibilities are substantially higher than those belonging to the desired torsional flexibility.

The movable portion 22 can rotate relative to the fixed portion 21 through a limited angle only, such that its movement during operation has an oscillating or reciprocal character. The fixed portion 21 is rigidly fastened to a component of the housing (in this case to the frame 13) of the flow sensing instrument in at least three points. Even better, as shown in FIG. 2, it is fastened along two edges. This fastening may be effected by means of bolts, welding, clamping, or gluing. Both a Coriolis tube and an additional mass, the so-termed balancing mass, are fastened to the moving portion 22. Together they form a rigid assembly that can oscillate about the axis of rotation 24. It is visible from FIG. 2 that holes 27 are provided for fastening the tube and holes 28 are provided for fastening the balancing mass in the moving portion 22. Alternative fastening techniques as mentioned above are again possible for this.

Figure 3A:
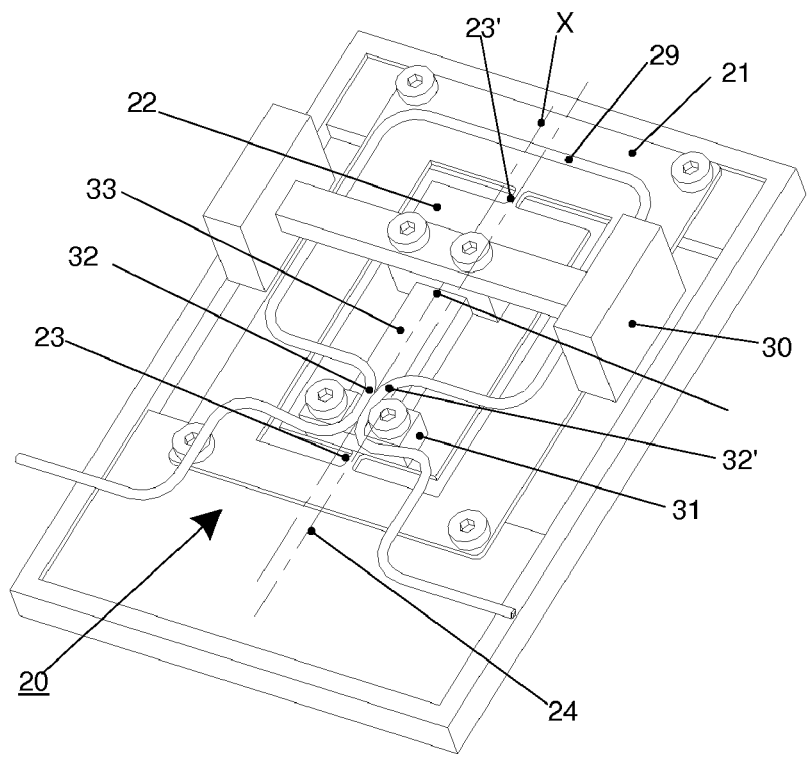
FIGS. 3A and 3B show a construction similar to that of FIG. 2, with two types of Coriolis tubes and a balancing mass being provided on the central portion.

FIG. 3A shows the metal plate 20 of FIG. 2 with the fixed portion 21 and the moving portion 22 interconnected by the resilient bridges 23, 23'. A Coriolis tube 29 and a balancing mass 30 have now been fitted on the moving part 22. The balancing mass 30 constructed as a kind of dumbbell with most of the mass being removed as far as possible from the axis of rotation 24. This is favorable for making the natural frequencies of undesirable flexibilities substantially higher than the natural frequency of the desired rotation about the axis 24, as was explained above. The tube 29 is fastened to the moving portion 22 via a tube fixation means or block 31.

FIG. 3A shows a tube 29 bent into the shape of a rectangular loop (the shape of a window antenna) with tube ends 32, 32' being fastened close together in the tube fixation block 31.

In a preferred embodiment, the fixation means are provided with a groove in which the tube is (partly) accommodated. Said groove offers a larger contact surface between tube and fixation means than does a planar surface, while also a more accurate positioning can be achieved without auxiliary tools. The tube may be fastened in the groove by means of welding, gluing, or soldering. An alternative fastening method is clamping between two sub-fixation means or between a sub-fixation means and the fastening point, wherein said components may or may not be provided with a groove for a more accurate positioning.

Figure 3B:
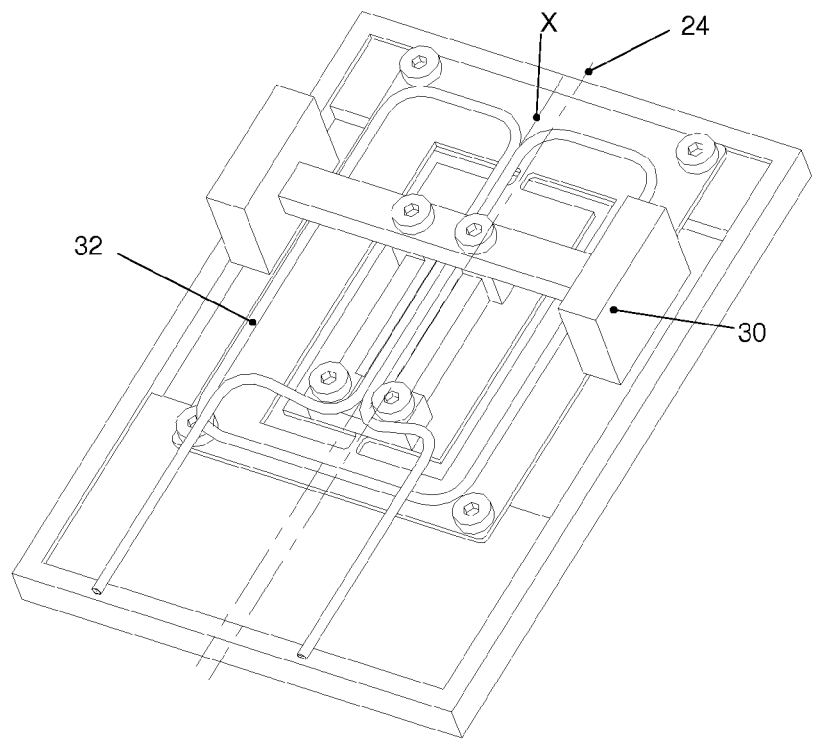

Although the invention is highly suitable for use with a tube as shown in FIG. 3A with a looped circumferential shape and two ends lying next to one another, the invention is not limited to the use of such a tube. The inventive principle of the resilient suspension is also applicable to tubes of other shapes, such as tubes with a U-shaped circumference, tubes with a circular circumference, or tubes with a triangular circumference, examples of which are shown in FIGS. 5 and 6 of EP 1 719 982 A1, where it is advantageous if the tube ends lie next to one another. The use of a particularly practical embodiment, corresponding to the tube shape of FIG. 1, in combination with a resilient suspension is shown in FIG. 3B. The tube is formed therein as it were by two loops lying side by side and connected in series, with ends lying next to one another for the inlet and outlet of the flow to be measured.

It is noted that the embodiments of FIGS. 3A and 3B comprise a beam-type element 33 by means of which the balancing mass 30 and the tube fixation means 31 are fastened on the movable portion 22. Alternatively, at least one of the balancing mass 30 and the fixation means 31 may be directly fastened to the movable portion 22. Another possibility is to fasten the fixation means with the Coriolis tube directly to a resiliently suspended balancing mass. In FIGS. 3A and 3B, furthermore, the axis of rotation of the moving portion 22 has the reference numeral 24. The excitation axis about which the Coriolis tube rotates is referenced X. It will be obvious that it is not possible in this construction to make the excitation axis X and the rotation axis 24 coincide completely. However, the object of the invention is also achieved if the axes X and 24 are at least substantially parallel and lie close together. The tube shapes discussed above all have two ends that lie closely next to one another adjacent (and in particular symmetrically relative to) the axis of rotation of the tube. This makes them particularly suitable for the resilient suspension according to the present invention.

Figure 4A:
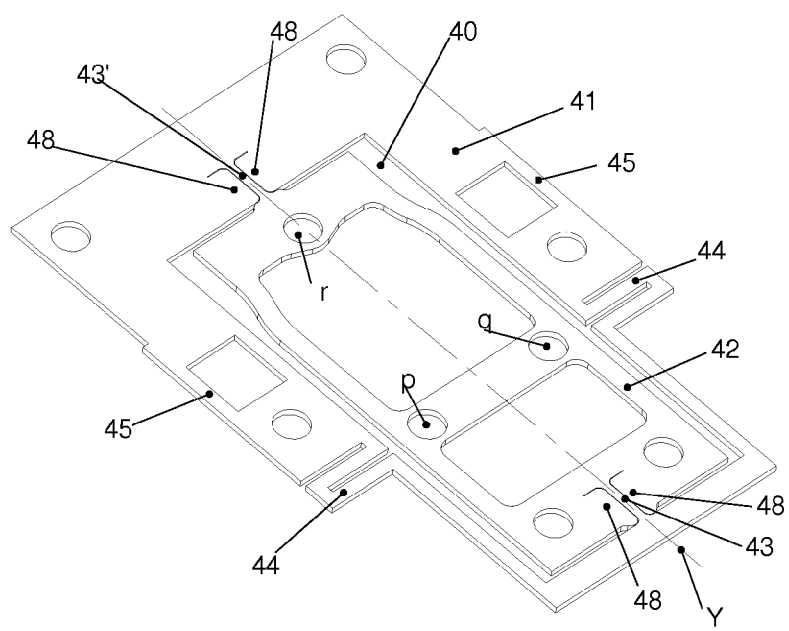
FIG. 4A shows a base plate with a resilient central portion having integrated abutments.

FIG. 2 shows a basic version of a planar metal support plate with integrated torsion spring elements. This basic version may be refined by one or several additions. This will be discussed with reference to FIG. 4. FIG. 4A shows a base plate 41 in which a rectangular central opening 40 was formed by means of incisions. After the incisions had been provided, a movable portion, i.e. the support plate 42, was left within the central opening 40. This support plate is movable relative to the fixed portion 41 owing to two elongate strips (bridges) 43, 43' arranged in line and also created by means of the incisions, which strips serve as torsion spring means. Compared with FIG. 2, some material has been left next to the elongate strips 43, 43' such that there is only a narrow gap between the elongate strips and the surrounding material. In FIG. 4A this material forms part of the base plate at the upper side of the Figure and of the support plate at the lower side of the Figure, but other combinations are equally possible.

This is the first refinement, which is referenced 48 (four times). Very narrow incisions are provided in these locations for forming the torsion springs.

Since the material of the fixed portion 41 or the moving portion 42, as applicable, has not been removed around the strips 43, 43', unlike in the embodiment of FIG. 2, it can serve as an abutment for limiting the amplitude of the relative movement between the support plate and the base plate in the plane of the base plate. This limitation reduces the material stresses in the torsion spring means that might arise, for example, in the case of a drop, in that the forces are absorbed via the mutually touching side walls of the gap. This prevents plastic deformations of the elongate strips in the case of excessive accelerations.

A construction will be presented further below in the description with abutments for preventing excessive movements out of the plane of the base plate, for example if the instrument is inadvertently dropped.

An alternative to the provision of abutments is the construction of the resilient plate from a superelastic material, such as Nitinol S. This material renders it possible to absorb all kinetic energy arising from dropping of the instrument in the resilient plate without permanent plastic deformation.

The second addition to the basic version is referenced 44 and 45 (twice each) in FIG. 4A. This relates to thermal decoupling elements added to the base plate 41 to counteract deformations imposed on the fixed portion 41 of the metal plate caused by deformations of the housing of the instrument, for example owing to temperature changes. The element 44 is a labyrinth for allowing deformations in the direction of the X-axis; the element 45 is a parallelogram construction for allowing deformations in a direction transverse thereto.

Figure 4B:
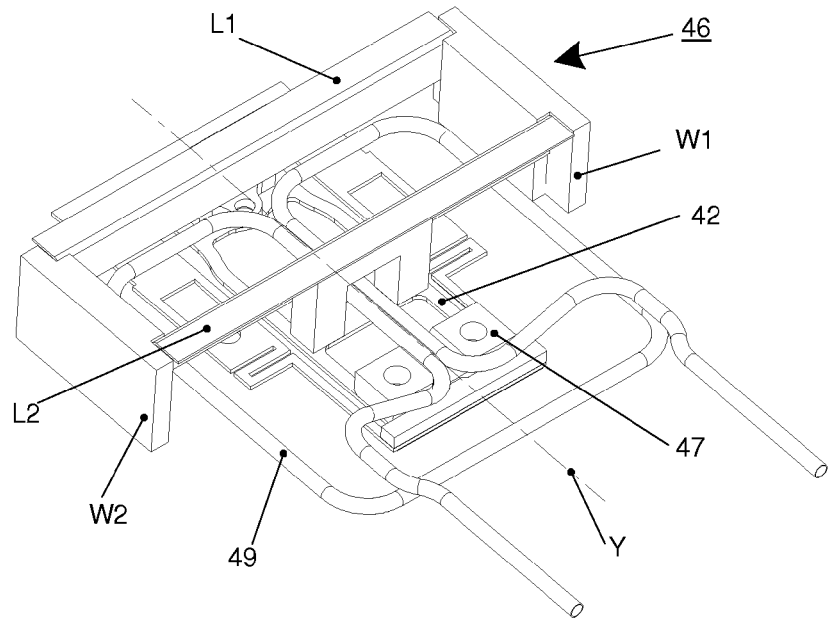
FIG. 4B shows the base plate of FIG. 4A with a balancing mass and a Coriolis tube.

FIG. 4B shows the resilient construction with the resilient base plate 42 of FIG. 4A after a balancing mass 46 and a tube fixation means 47 with a Coriolis tube 49 have been provided thereon. The balancing mass 46 in this case comprises two parallel connecting elements L1 and L2 which extend transversely to the and symmetrically with respect to the axis of rotation Y of the support plate 42, the latter element being connected to the resilient support plate 42 by means of an intermediate bridge piece in locations p and q and the former element by means of an I-shaped intermediate piece in location r. The ends of the connecting elements in this example project to outside the circumference of the tube 49 and are provided with (balancing) weights W1 and W2. The center of gravity of the balancing construction lies on the axis of rotation Y.

Figure 5A:
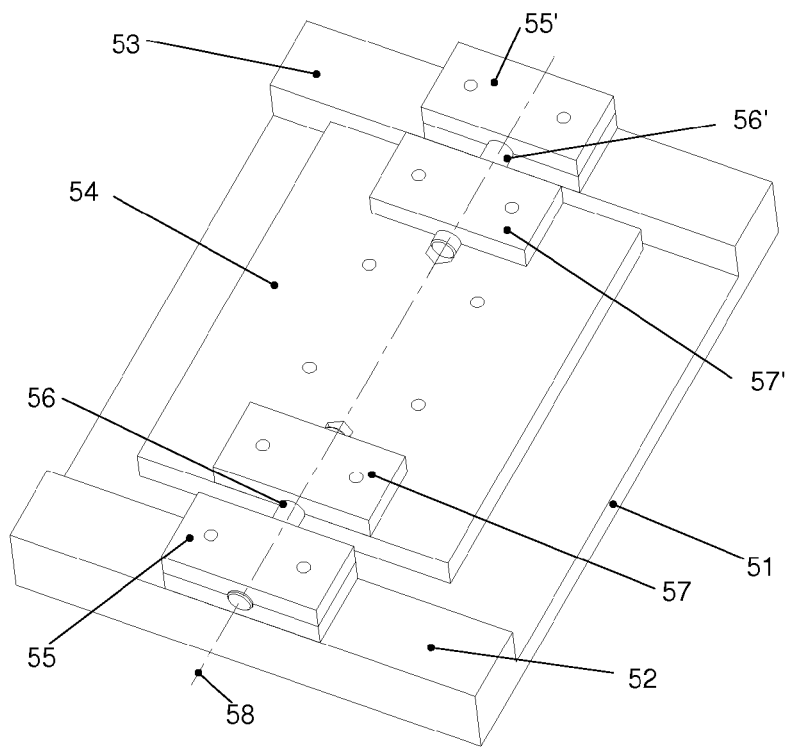
FIG. 5A shows a base plate with a support plate suspended therefrom by means of torsion spring elements.

FIG. 5A shows a different embodiment of the resilient construction according to the invention. This does not utilize a single plate provided with incisions with a movable central portion as in FIG. 2; instead, the fixed part 51 and the moving part 54 are separate components here. The fixed part 51 has two mutually opposed edges 52, 53 in this case. These may be the edges of an opening or edges raised from a base surface. The moving part 54 extends between these edges and is connected thereto via two torsion spring elements 56, 56' which lie in one another's extended direction. The elements 56, 56', which are made of a resilient metal such as spring steel, are fastened on the one hand to the edges of the fixed part (preferably by clamping) by means of fastening elements 55, 55' (which are block-shaped in this case, but the invention is not limited thereto), and on the other hand to two mutually opposed edges of the moving part by means of fastening elements 57, 57'. The torsion spring elements 56, 56' may have a circular cross-section as drawn, but rectangular as in FIG. 2, triangular, hollow cylindrical, and other cross-sections are possible alternatives. The cross-section may be constant over the length of the torsion spring element, or it may vary to suit certain applications. The parts 51, 54 may be manufactured from a metal or a (hard) synthetic resin material, provided this is stronger than the material of the torsion spring elements. The axis of rotation is referenced 58.

Figure 5B:
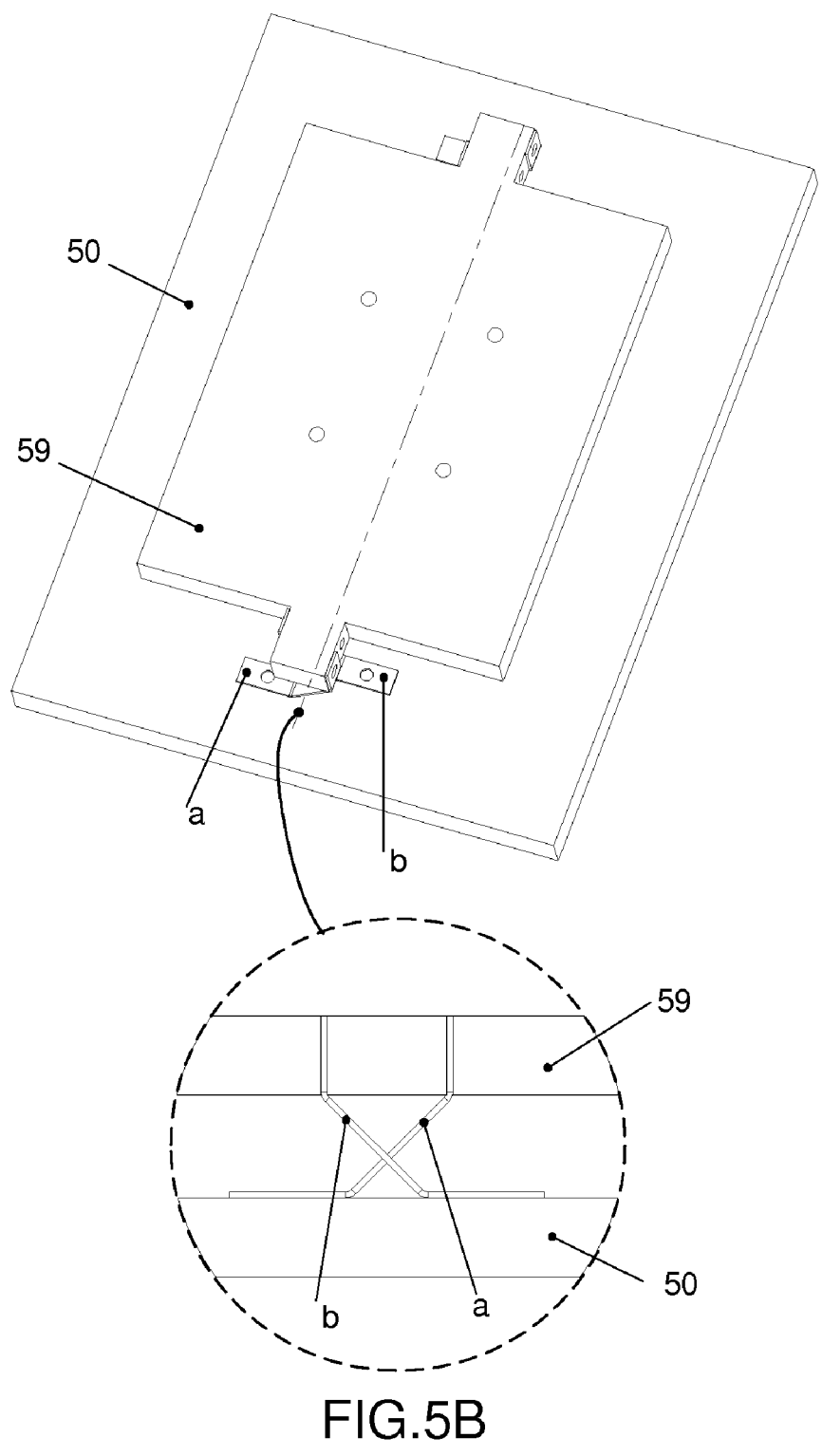
FIGS. 5B and 5C show respective base plates with support plates suspended by means of planar springs.
Figure 5C:
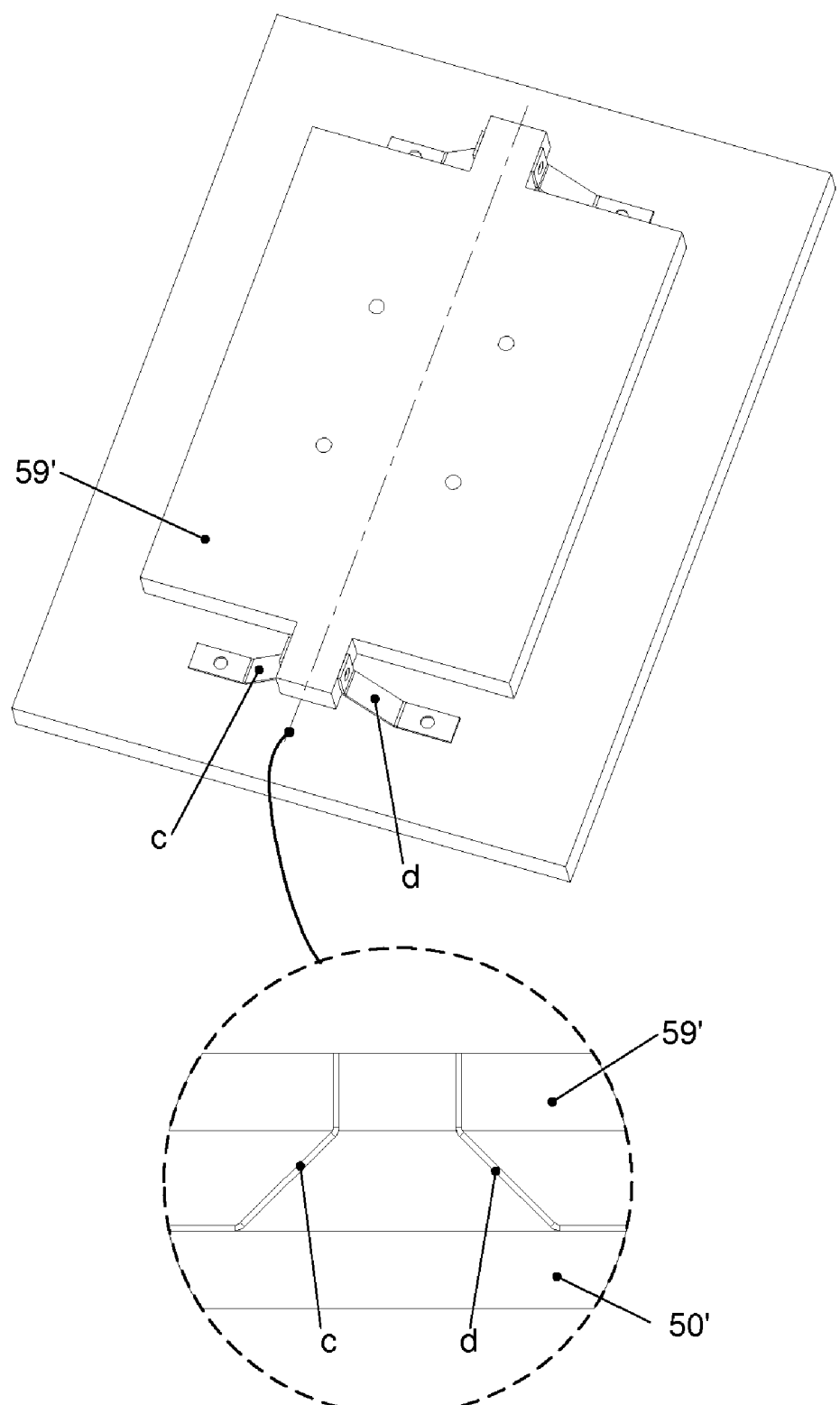

An alternative to the torsion spring element construction involving a separate base plate (fixed part) and support plate (moving part) as described with reference to FIG. 5A is formed by the use of two flat spring elements (blade springs) that are arranged at an angle to one another and that are fastened to each of two mutually opposed ends of the support plate and to the base plate. The spring elements of such a pair may cross each other as shown in FIG. 5B (springs a, b), in which case the axis of rotation will lie between the base plate 50 and the support plate 51, or their extensions may intersect as shown in FIG. 5C (springs c, d). where the angle between springs c and d may be chosen such that the axis of rotation passes through their point of intersection adjacent the upper surface of the support plate 59'. The springs are connected to projections at the movable part 59, 59' that extend parallel to the axis of rotation in the embodiments shown, but the invention is not limited thereto.

An important addition to the resilient mounting of the balancing mass in that in which abutments are provided for counteracting plastic deformation of the spring elements in the case of strong accelerations. The favorable effect of abutments in the plane of the plate has already been discussed with reference to FIG. 4A, 4B. It is favorable to add also abutments perpendicular to this plane.

Figure 6A:
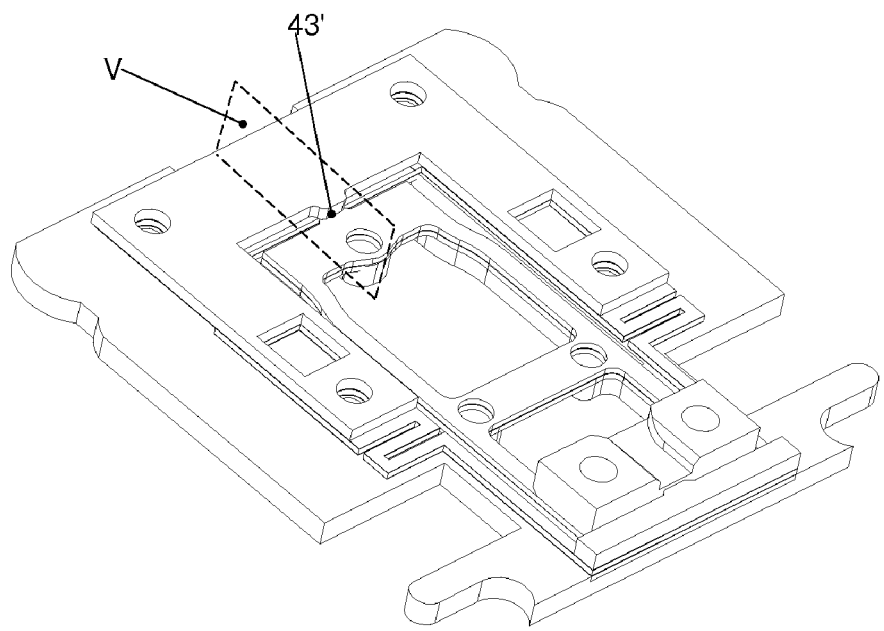
FIG. 6A is perspective view of a construction of a base plate and a support plate with external abutments.
Figure 6B:
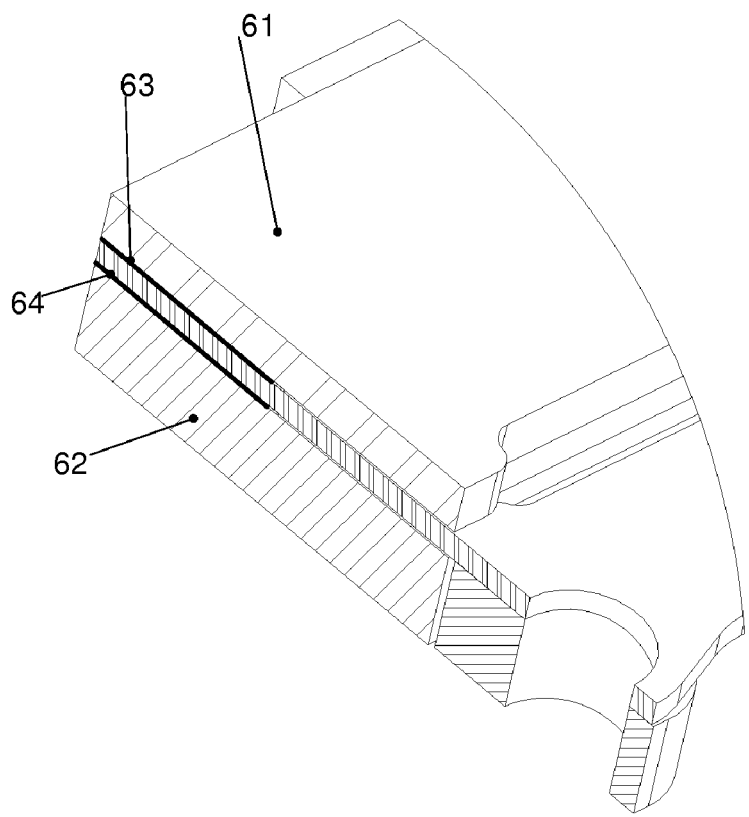
FIG. 6B is a cross-sectional view through a portion of the construction of FIG. 6A.

FIG. 6A, 6B shows a possible embodiment of this. FIG. 6A is a perspective view of the metal plate of FIG. 4 A with the central portion that can rotate about bridges, to which abutments have been added, and FIG. 6B shows a cross-section V taken perpendicularly to the plane of the metal plate of FIG. 6A at the area of one of the bridges, i.e. the bridge 43'. Comparatively thick plates 61, 62 are arranged above the bridge 43' so as to serve as abutments in the case of excessive movements of the moving portion relative to the fixed portion, the distance from the plates to the bridge being accurately defined by means of thin spacer plates or shims 63, 64. The mass forces occurring in the case of a drop in the direction transverse to the plate will not be transmitted now through the bridges (the torsion spring means), but will be absorbed via the much thicker abutment plates.

Figure 7A:
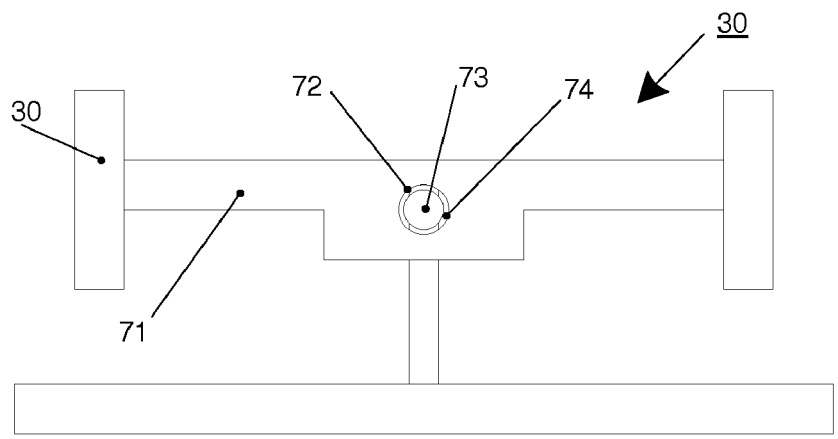
FIGS. 7A and 7B are elevations of balancing masses with two different abutment means.
Figure 7B:
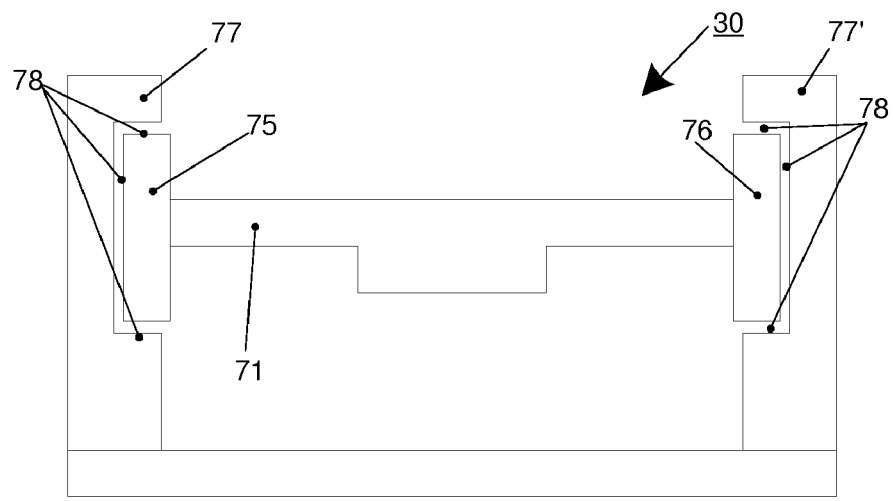

FIGS. 7A and 7B show two alternative versions of abutments which act both in and out of said plane of the metal plate. In FIG. 7A, which is an elevation taken transversely to the axis of rotation of the balancing mass 30 of FIG. 3A, 3B, a hole 72 has been provided in the center of the bridge part 71 of the balancing mass 30. This hole may be, for example, cylindrical in shape. A pin 73 is arranged therein and is fastened at its other end to the housing of the flow sensing instrument. An accurately defined and adjusted circumferential clearance 74 is present between pin and hole, which defines the amplitude of the movement of the balancing mass 30. In FIG. 7B, which is also an elevation taken transversely to the axis of rotation 24 of the balancing mass 30 of FIG. 3A, a claw 77, 77' is provided around each of the two ends 75, 76 of the balancing mass 30, again with a well defined clearance 78. This is effective especially if the normal rotational amplitude of the balancing mass is substantially smaller than the maximum allowed impact amplitude. This is the case given a sufficiently high ratio of the moment of inertia of the balancing mass to that of the tube (from approximately a factor of 25 onward).

Figure 8:
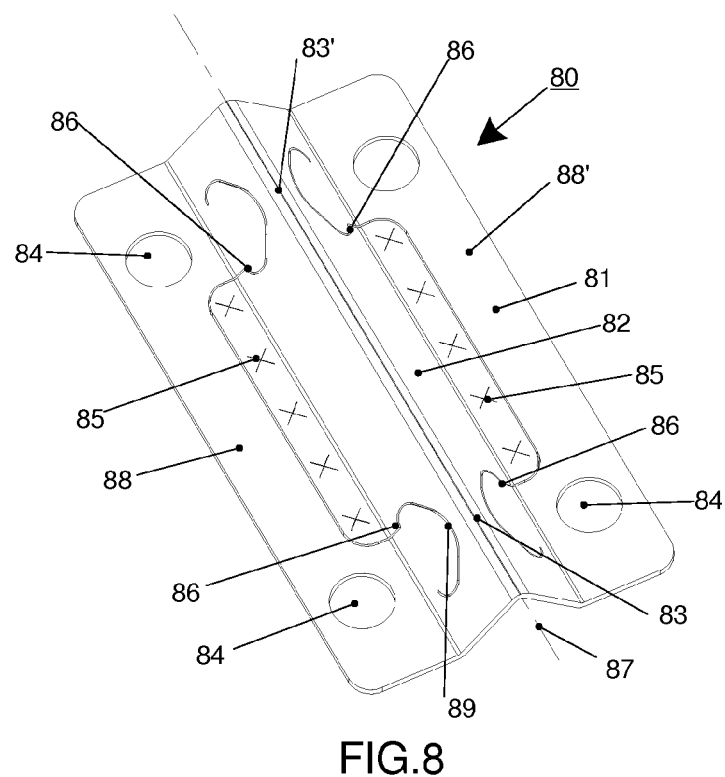
FIG. 8 shows a base plate folded about a centerline with a resilient central portion.
Figure 9:
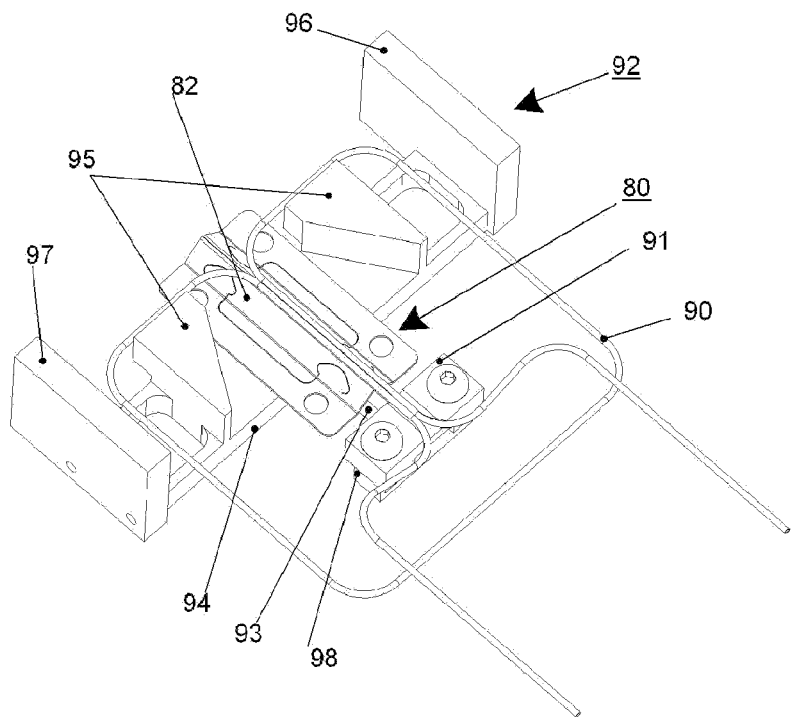
FIG. 9 shows the base plate of FIG. 8 provided with a balancing mass and a Coriolis tube.

A second embodiment comprises a bent resilient plate with integrated abutments. The two torsion spring elements and the abutments are combined into a single component for all three directions of translation in this embodiment: a bent metal plate of resilient material. This is shown in FIGS. 8 and 9. FIG. 8 shows a rectangular plate 80 of resilient material, such as spring steel, from which a fixed portion 81 (base plate) and inside this a movable portion 82 (support plate) are formed by means of two incisions which extend partly in longitudinal direction and partly transversely thereto and which are symmetrical with respect to the longitudinal axis. The plate 80 is bent along a folding line 87 and the lateral portions 88, 88' are bent back so as to lie in one plane in this case. The pairs of mutually opposed incisions define resilient bridges 83, 83' which interconnect the fixed and the movable portion adjacent the ends of the folding line 87. Alternative constructions may have lateral portions not in one plane, or lateral portions that have not been folded back. The base plate may alternatively be folded along two lines instead of one, so that a planar surface is present between the folded sides. The base plate is fastened to the housing, for example by its lateral edges. The incisions which define each bridge each constitute approximately half of the edge of a hole. What is left adjacent the hole serves as an abutment. The holes may be, for example, round, oval, or elongate. Two of these holes together form an elastic hinge with integrated abutments. It is moreover a folded hinge, the fold achieving that the construction is rigid in two translation directions (lying in a plane transverse to the folding line 87 that defines an axis of rotation) instead of one, and that the integrated abutments are also active in both these translation directions. The axis of rotation of the construction thus formed lies approximately in the tip of the folding line 87 of the plate 80. The clearances 89 (four in number) formed by the incisions define the maximum movement amplitude that is possible between the fixed and the moving portion. The relative movement is greatest at points 86: an abutment is created in two directions for each of the four points 86 here in that the path of the incision is made to curve back. Holes 84 provided in the lateral portions 88, 88' serve to fasten the fixed portion 81 in the housing of a flow sensing instrument by means of bolts. An alternative to fastening with bolts is, for example, spot welding. A balancing mass is fastened to the movable portion 82 in points 85, the crosses indicating spot welds here. The metal plate 80 with the incisions therein as shown may be manufactured by laser cutting or etching and subsequently folded in an angle bending machine or some other bending tool.

FIG. 9 once more shows the bent plate 80 of FIG. 8 with the resilient central portion 82. The resilient central portion 82 here supports a balancing mass 92, while a Coriolis tube 90 of the type shown in FIGS. 1 and 3B is fixed with its ends in a tube fixation block 91. The balancing mass 92 is formed by a connecting element (bridge) 94 in this case, at whose ends two weights (or end masses) 96, 97 are present. The connecting element 94 has a projection 93 which is integral with it or is fastened to it. The tube fixation block 91 is fastened to a fixation point 98 of the projection 93, so that the balancing mass 92 and the tube fixation block 91 are connected (coupled) to one another. This means that in this embodiment the tube fixation block is fastened to the balancing mass, the latter being resiliently suspended in the housing. This is in contrast to, for example, the embodiments of FIGS. 3A, 3B, and 4B, where the tube fixation block and the balancing mass are jointly fastened on a support plate and the support plate is resiliently suspended. The tube 90 is arranged in the fixation block 91 such that it is not in contact with the movable central portion (the support plate) 82, but lies just above it, and such that the centerline of the two central tube portions is right above the folding line of the bent plate. The axes of rotation of the Coriolis tube and the resilient action coincide as much as possible in this manner (this situation is less optimal in the constructions of FIGS. 3A and 3B).

FIG. 9 further shows two wedge blocks 95 of magnetizable material which form part of the balancing mass. Together with an intermediate plate of magnetizable material these form the lower part of a magnet yoke, comparable to the magnet yoke part 8*b* of FIG. 1, which is used for the Lorentz force excitation of the tube vibration.

Figure 10A:
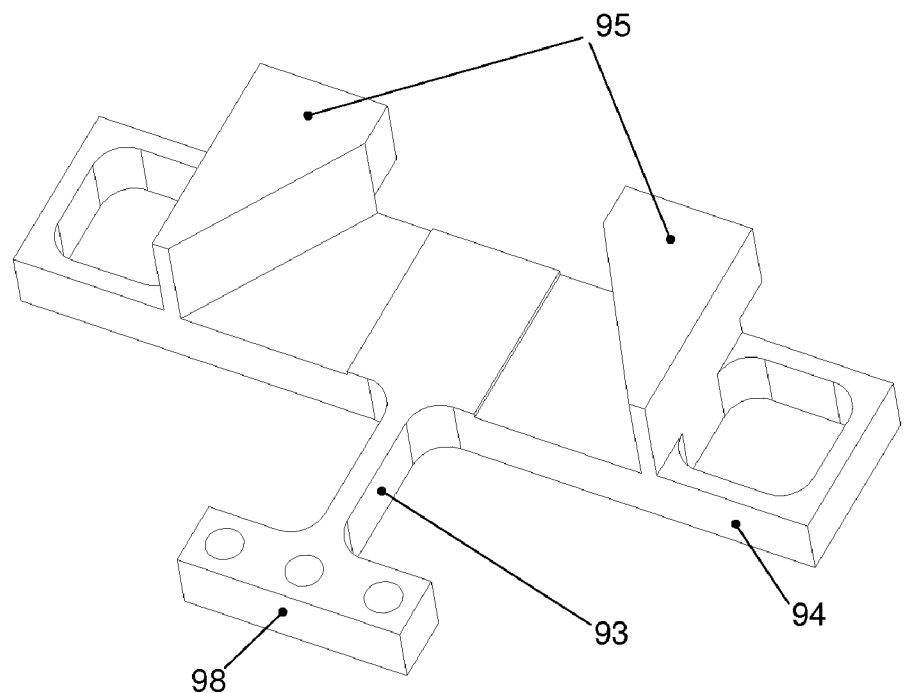
FIGS. 10A and 10B show different embodiments of the balancing arm of a balancing mass with a projection forming a flexible and a rigid connection, respectively.
Figure 10B:
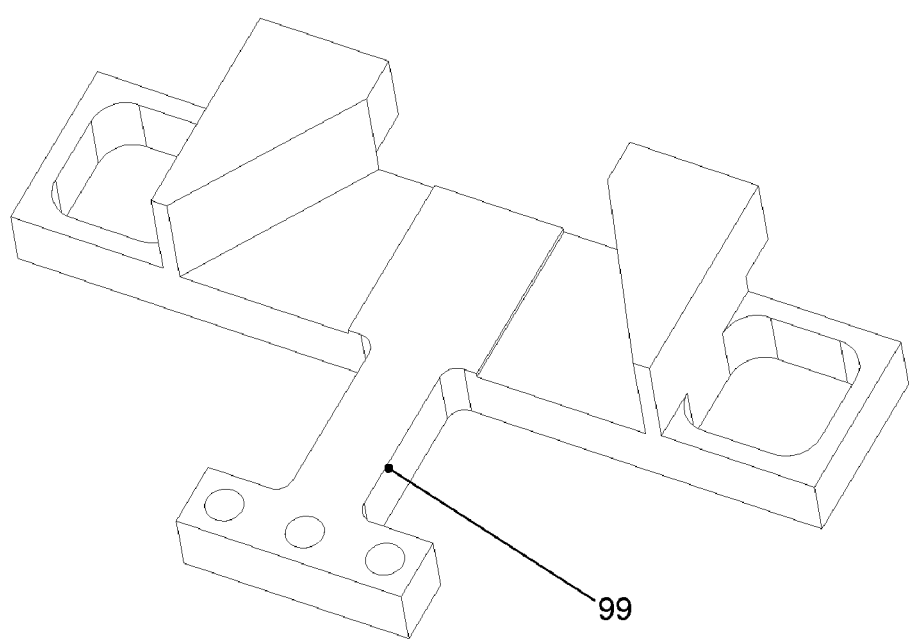

FIG. 10A shows the connecting element (the bridge) 94 of the balancing mass 92 of FIG. 9. The projection 93, which may be integral with the bridge 94 or may be connected thereto as a separate component, is better visible in this Figure. The projection 93 has at its end a fastening point 98 that serves for fastening the tube fixation block 91. Depending on the material and the dimensions of the projection 93, this constitutes a rigid or a flexible connection between the bridge 94 and the tube fixation block 91. The projection in FIG. 10A is made thin at least locally so as to provide a flexible connection, whereas the projection in FIG. 10B is thicker, the material and the other dimensions remaining the same, so that a rigid connection is provided. In the flexible construction of FIG. 10A, the material and dimensions of the resilient connection between the bridge of the balancing mass and the fastening point of the tube fixation means are chosen such that the natural frequency of the rotation of the tube fixation means about the excitation axis lies as much as possible centrally between the natural frequencies of the tube and of the balancing mass. In the rigid construction of FIG. 10B, the material and dimensions of the connection between the bridge of the balancing mass and the fastening point of the tube fixation means are chosen such that the natural frequencies of the fastening of the tube fixation means are substantially higher (by at least 20%) than that of the excitation vibration of the tube and that of the resilient suspension of the entire balancing mass assembly relative to the housing.

Figure 11:
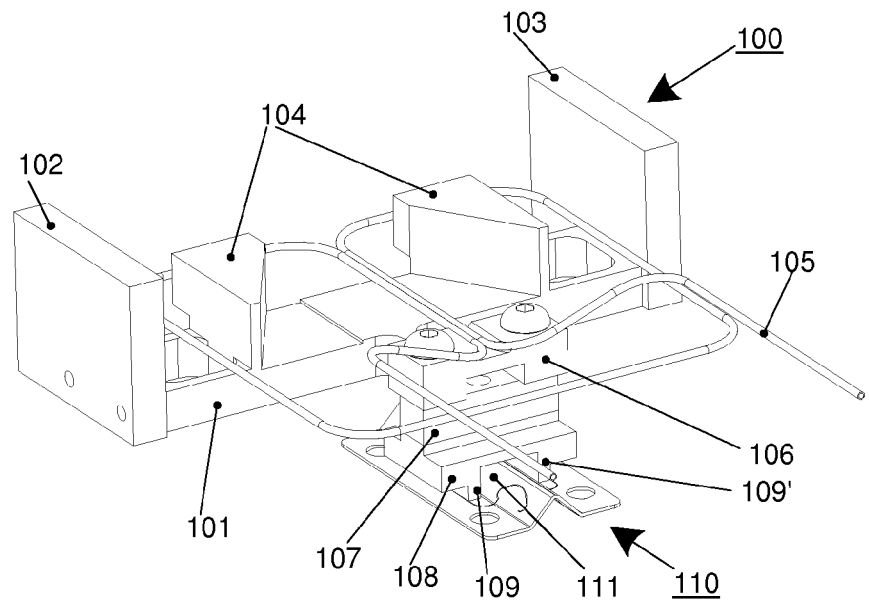
FIG. 11 shows a tube fixation block coupled to a balancing mass, said the tube fixation block being connected to a resilient support.

FIG. 11 shows a balancing mass 100 with a connecting bridge 101 and end weights 102, 103. A resilient support system 110 comparable to the support system 80 of FIG. 9 is fastened to a fixation block 106 with Coriolis tube 105 in this case. The fastening is effected by a connection block 108 with legs 109, 109', the movable portion 111 of the support system 110 being fastened to the legs 109, 109', for example by spot welding. The connection block 108 is connected to a component 107, the so-termed fastening point, which is rigidly or flexibly connected to the connecting bridge 101, as was component 98 in FIGS. 9 and 10. The connection between the connection block 107, which also supports the fixation block 106, and the connecting bridge 101 is not visible in FIG. 11. FIG. 11 accordingly shows the situation in which the movable portion of the support system is connected to the fixation block with tube and not to the balancing mass as in FIG. 9. Compared with FIG. 9, an additional block has been added below the fastening point of the tube fixation block, which additional block is arranged with two legs over the bent spring, the lower side being fastened to said spring preferably by spot welding. The additional block, the fastening point of the tube fixation block, and the tube fixation block itself may be manufactured from one piece of material.

Figure 12:
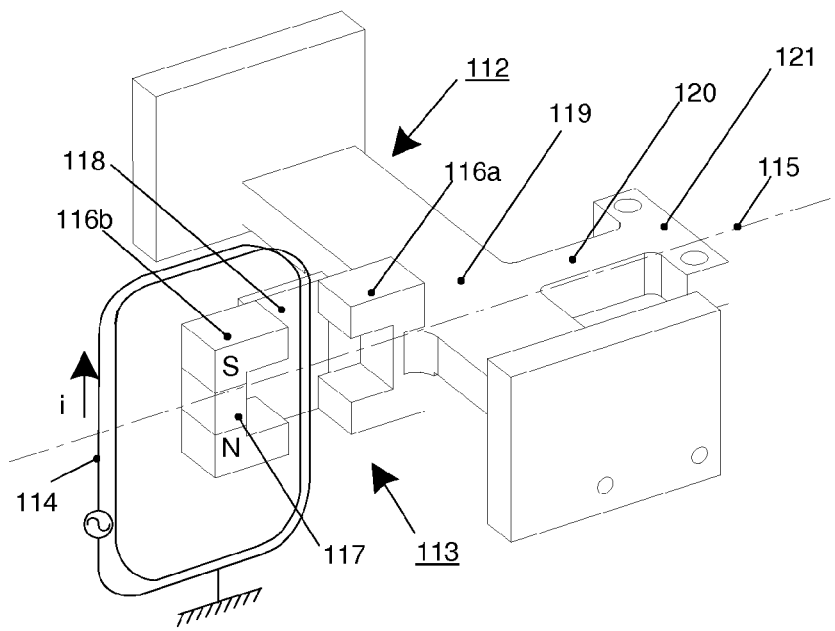
FIG. 12 shows a balancing mass with means for Lorentz force actuation.

FIG. 12 shows a balancing mass 112 comparable to the balancing mass 92 connected to a Coriolis tube 90 in FIG. 9. In this case, however, it is not the Coriolis tube that is excited by a Lorentz force actuator, as in FIG. 1, but the balancing mass 112 is excited by a Lorentz force actuator. For this purpose a magnet configuration 113 is fastened to the connecting bridge 119 of the balancing mass 112 so as to cooperate with an electric coil 114 which is fixedly arranged in the housing and of which a portion is positioned relative to the magnet configuration 113 such that said magnet configuration 113 with the attached balancing mass 112 starts to oscillate about an axis 115 when the coil 114 is energized by an alternating current i. The magnet configuration 113 of FIG. 12 is formed by a magnet yoke that is divided into two halves 116, 116', wherein two gaps are formed between the two halves, which are interconnected by a non-magnetic connecting piece 118, part of the coil extending through said two gaps. Oppositely directed magnetic fields generated by a magnet 117 placed in the path of the yoke 116, 116' are present in the gaps. A 'magnet yoke' herein is understood to be a circumferential (closed annular) core of soft magnetic material. An alternative embodiment of the magnet configuration comprises two U-shaped permanent magnets arranged at a short distance from one another with their opposite poles facing one another. The coil 114 preferably has a number of turns. The coil 114 in this embodiment forms part of the solid world and the entire yoke 116, 116' forms part of the moving assembly. The balancing mass 112 has a projecting tail 120 which issues into a tube fixation point 121 with holes for fastening a tube fixation block with tube such as in FIG. 10. The magnet yoke 116, 116' causes the balancing mass 112 to vibrate, the latter in its turn exciting the Coriolis tube (not shown).

Figure 13A:
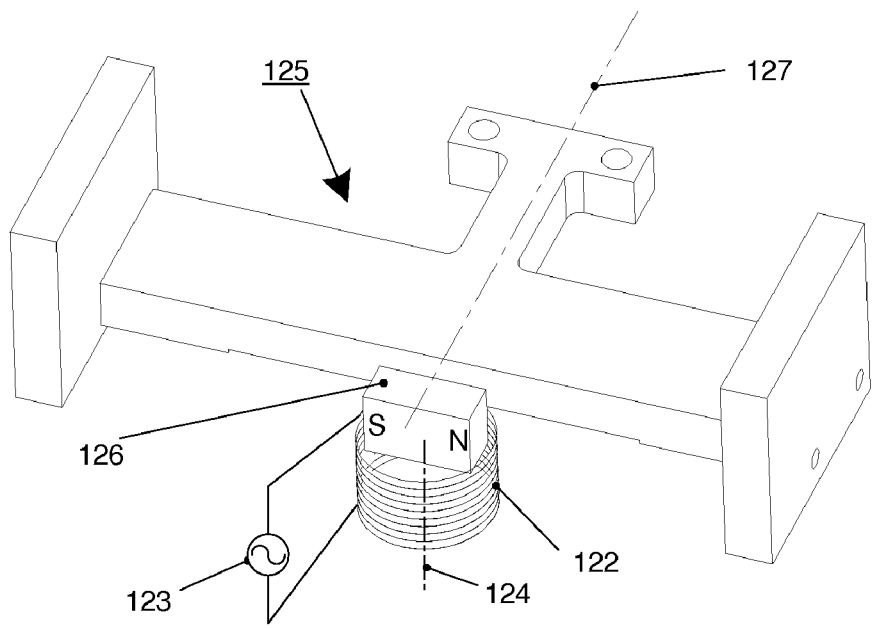
FIGS. 13A and 13B show two different versions of balancing masses with means for electromagnetic actuation.

In FIG. 12, the magnet yoke 116, 116' of the magnet configuration 113 is oriented transversely to the plane of the Coriolis tube (not shown). An alternative is to place a magnet yoke divided into two halves parallel to the plane of the Coriolis tube and to have it cooperate with an electric coil of which a portion extends through the two gaps between the yoke halves. Another possibility for exciting the balancing mass is that a single magnet is fastened to the connecting bridge or to the tail piece of the balancing mass and is made to cooperate with a coil that is fastened to the housing and is energized by an alternating current, said coil generating an electromagnetic field transverse to the field of the magnet. A basic version of this type of electromagnetic excitation is shown in FIG. 13A. An electric coil 122 is accommodated in a housing (not shown). This coil 122 is energized by an alternating current 123. A permanent magnet 126 having a North pole N and a South pole S fastened to the connecting bridge of the balancing mass 125 is located on the extension of the centerline 124 of the coil 122, or possibly partly within the coil. The North-South axis of the magnet 126 is perpendicular both to the centerline 124 through the coil 122 and to the axis of rotation 127 of the balancing mass 125. When a current is passed through the coil 122, a magnetic field will arise. The magnet 126 placed in the field of the coil 122 will tend to align itself with this field. An alternating magnetic field will arise when the coil receives an alternating current instead of a direct current so that the magnet 126, and accordingly the balancing mass 125 and the Coriolis tube connected thereto via the tube fixation means, will perform a rotational vibration.

Figure 13B:
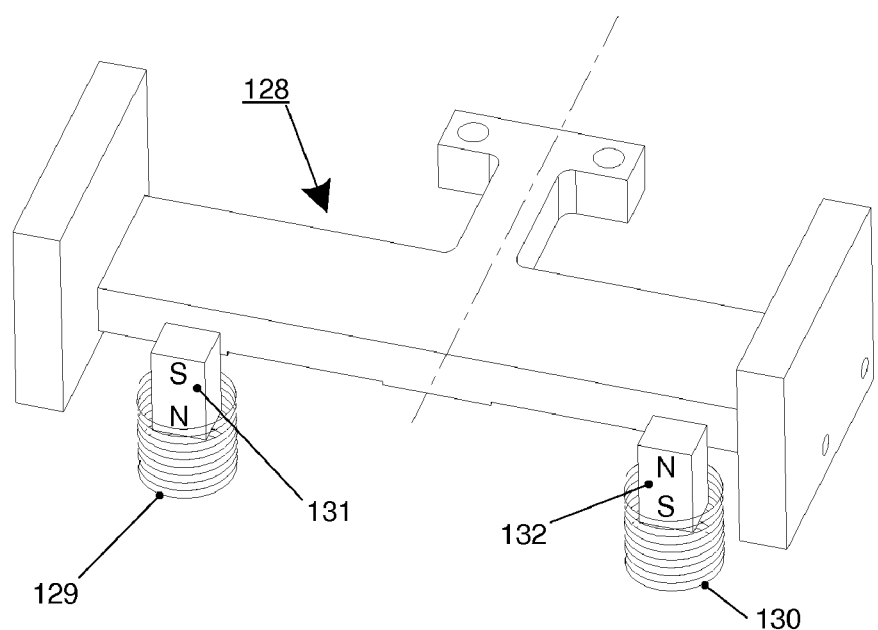

FIG. 13B shows a modified version of the electromagnetic excitation of the balancing mass of FIG. 13A. In this case a torque acting on the balancing mass 128 is generated by the cooperation of two electric coils 129, 130, which are placed at some distance from one another and from the axis of rotation, with two permanent magnets 131, 132 whose North-South axes are located parallel to or in the extensions of the electromagnetic fields generated by the coils 129, 130 when the latter are energized. The electric coils are preferably arranged adjacent the ends of the balancing mass. The forces of the torque are brought into counterphase in that (as drawn) the magnets are oppositely oriented while the electromagnetic fields of the coils have the same direction. Alternatively, the magnets may have the same direction whereas the currents through the coils are oppositely directed, so that the generated electromagnetic fields are oppositely directed.

The coil or coils is or are fixedly mounted in the housing for bringing the Coriolis tube into vibration, and the magnet configuration is fixed to the 'moving world'. With the resiliently suspended balancing mass according to the invention this is, for example, the balancing mass. When the frequency of the alternating current through the coil is made equal to the natural rotation frequency of the tube, the tube will be brought into resonance via its tube fixation means. If the balancing mass has a rigid tail piece (reference numeral 99 in FIG. 10B), the magnet configuration can be fastened either to the balancing mass or to the tube fixation means; in the case of a flexible tail piece (reference numeral 93 in FIG. 10A), it can only be fastened to the balancing mass.

Besides the Lorentz force actuation and the electromagnetic excitation for exciting the balancing mass, alternative excitation methods are conceivable such as, for example, piezoelectric or thermal excitation.

Summarizing, the invention relates to a Coriolis flow sensor with a Coriolis tube that is fastened in a housing and that can be excited with a certain frequency, wherein a balancing mass (inertia) is arranged with rotational flexibility between the tube fastening and the housing. In particular, a spring steel plate is used for providing a connection rigidity between the balancing mass and the housing, which plate comprises a fixed portion and a movable portion cut out from the fixed portion, wherein the incisions are formed such that the fixed and movable portions are interconnected via resilient plate portions, which resilient plate portions are in particular elongate strips lying in one line and realizing a rotational flexibility (torsion), while abutments are provided which limit the amplitude of movements of the balancing mass.

Important design considerations in this are:
the axes of the excitation movements of the tube and the balancing mass must coincide as much as possible, and the centers of gravity of the tube and the balancing mass must lie on this common axis as much as can be achieved; and
this common axis is the axis of symmetry of the tube and of the balancing mass.

The invention claimed is:

1. A Coriolis flow sensor with a Coriolis tube that has two ends and is fastened in a housing, said ends being fixed in a fixation means while the tube portion located between said two ends lies free, which flow sensor comprises excitation means for causing the tube to oscillate about an excitation axis and detection means for detecting displacements of portions of the tube during operation,
characterized in that said fixation means is connected to a balancing mass, and in that the total assembly of balancing mass and fixation means is resiliently suspended relative to the housing by resilient suspension means such that said assembly can rotate about a rotation axis that is at least substantially parallel to or coincides with the excitation axis of the tube.

2. A Coriolis flow sensor as claimed in claim 1, characterized in that the flow sensor is provided with a support plate, in that at least one of the fixation means with the ends of the Coriolis tube and the balancing mass fixed therein is fastened on this support plate, and in that the support plate is suspended relative to the housing by means of two torsion spring means in linear arrangement such that it can rotate about said rotation axis.

3. A Coriolis flow sensor as claimed in claim 2, characterized in that the flow sensor is provided with a base plate of resilient metal that is fixedly connected to the housing, which base plate has a central opening, and in that the support plate and the torsion spring means extend within said opening and are formed from the material of the base plate by means of incisions provided in the base plate, such that the torsion spring means have the shape of elongate strips which constitute the sole connection between the support plate and the base plate and the support plate is suspended in the opening of the base plate by means of said elongate strips.

4. A Coriolis flow sensor as claimed in claim 3, characterized in that the assembly of base plate and support plate constitutes a planar plate.

5. A Coriolis flow sensor as claimed in claim 4, characterized in that the assembly of base plate and support plate is provided with integrated abutment points for limiting the amplitude of relative movements of the support plate with respect to the base plate in the plane of the base plate.

6. A Coriolis flow sensor as claimed in claim 4, characterized in that the elongate strips are each bounded on either side by a respective incision, said incisions forming an elastic hinge with integrated abutment.

7. A Coriolis flow sensor as claimed in claim 6, characterized in that the incisions bounding the strips on either side have a width such that the plate material at the other side of the incisions acts as an abutment for limiting the amplitude of movements in the plane of the base plate.

8. A Coriolis flow sensor as claimed in claim 4, characterized in that abutment plates are arranged above and below at least one elongate strip, which abutment plates are each kept at a distance from the strip by a spacer plate so as to serve as an abutment for limiting movements of the support plate away from the plane of the base plate.

9. A Coriolis flow sensor as claimed in claim 3, characterized in that the assembly of base plate and support plate constitutes a folded plate.

10. A Coriolis flow sensor as claimed in claim 9, characterized in that the assembly of base plate and support plate is provided with integrated abutment points for limiting the amplitude of relative movements of the support plate with respect to the base plate both in and transverse to the plane of the base plate.

11. A Coriolis flow sensor as claimed in claim 9, characterized in that the assembly of base plate and support plate is provided with integrated abutment points for limiting the amplitude of relative movements of the support plate with respect to the base plate in the plane of the base plate.

12. A Coriolis flow sensor as claimed in claim 1, characterized in that the balancing mass and the fixation means are fastened to one another in a flexible manner.

13. A Coriolis flow sensor as claimed in claim 1, characterized in that the resilient suspension means comprises torsion spring means which connect the support plate directly or indirectly to the housing and which are formed by torsion hinges, obliquely positioned blade springs, or cross-spring hinges, which may or may not be planar.

14. A Coriolis flow sensor as claimed in claim 1, characterized in that the balancing mass is arranged transverse to and with its center of gravity on the axis about which it can rotate.

15. A Coriolis flow sensor as claimed in claim 14, characterized in that the greatest mass portion of the balancing mass is located adjacent the ends of the balancing mass farthest removed from its axis of rotation.

16. A Coriolis flow sensor as claimed in claim 1, characterized in that either the balancing mass or the tube fixation means cooperates with actuator means for causing the balancing mass and the tube fixation means to rotate about the rotation axis.

* * * * *